US009447830B2

(12) United States Patent
Bull

(10) Patent No.: US 9,447,830 B2
(45) Date of Patent: Sep. 20, 2016

(54) ELECTRIC BRAKE ACTUATOR FOR VEHICLES

(71) Applicant: ADVICS NORTH AMERICA, INC., Plymouth, MI (US)

(72) Inventor: Marshall Bull, Wixom, MI (US)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 116 days.

(21) Appl. No.: 14/297,955

(22) Filed: Jun. 6, 2014

(65) Prior Publication Data

US 2015/0354650 A1 Dec. 10, 2015

(51) Int. Cl.
| F16D 65/18 | (2006.01) |
| F16D 121/24 | (2012.01) |
| F16D 125/34 | (2012.01) |
| F16D 125/50 | (2012.01) |
| F16D 125/48 | (2012.01) |

(52) U.S. Cl.
CPC ........... F16D 65/18 (2013.01); *F16D 2121/24* (2013.01); *F16D 2125/34* (2013.01); *F16D 2125/48* (2013.01); *F16D 2125/50* (2013.01)

(58) Field of Classification Search
CPC ...... B60T 11/04; B60T 11/102; F16D 65/18; F16D 2121/02; F16D 2121/24; F16D 2123/00; F16D 2125/40; F16D 2125/50; F16D 2131/00
USPC ....... 188/162, 106 R, 158; 74/661; 474/4, 5, 474/6-7, 149, 150; 701/22
See application file for complete search history.

(56) References Cited

U.S. PATENT DOCUMENTS

| 3,218,887 A | * | 11/1965 | Flynn | ........................ G01S 7/56 |
| | | | | 116/202 |
| 3,225,626 A | * | 12/1965 | Geyer | ............................. 74/661 |
| 5,769,748 A | * | 6/1998 | Eyerly | ...................... F16H 3/72 |
| | | | | 475/150 |

(Continued)

FOREIGN PATENT DOCUMENTS

| JP | 11-148522 | 6/1999 |
| JP | 2010-038307 | 2/2010 |

(Continued)

OTHER PUBLICATIONS

Written Opinion of the International Searching Authority issued in corresponding International Application No. PCT/JP2015/002835, dated Aug. 4, 2015 (4 pages).

(Continued)

*Primary Examiner* — Robert A Siconolfi
*Assistant Examiner* — San Aung
(74) *Attorney, Agent, or Firm* — Buchanan Ingersoll & Rooney PC

(57) ABSTRACT

An electric brake actuator includes first and second electric motors and an actuator output, a first cycloidal speed reducer having a first reducer input rotatable about a first reducer axis and operatively connected to the first motor output gear to receive a first driving force, and a first reducer output rotatable about the first reducer axis and operatively connected to the actuator output to transfer the first driving force to the actuator output, and a second cycloidal speed reducer having a second reducer input rotatable about a second reducer axis and operatively connected to the second motor output gear to receive a second driving force and a second reducer output rotatable about the second reducer axis and operatively connected to the actuator output to transfer the second driving force to the actuator output.

15 Claims, 17 Drawing Sheets

(56) References Cited

U.S. PATENT DOCUMENTS

| | | | |
|---|---|---|---|
| 6,138,801 A | 10/2000 | Shirai et al. | |
| 6,379,276 B1 * | 4/2002 | Cheng | F16H 37/0826 475/330 |
| 7,108,625 B2 * | 9/2006 | Konig | F16H 37/0826 475/5 |
| 2003/0205437 A1 | 11/2003 | Drennen et al. | |
| 2004/0124042 A1 * | 7/2004 | Kriz, II | F16D 65/18 188/162 |
| 2006/0113149 A1 * | 6/2006 | Prat | B60T 11/046 188/2 D |
| 2006/0166771 A1 * | 7/2006 | Yamanaka | B62D 5/008 475/4 |
| 2013/0184112 A1 * | 7/2013 | Choi | F16H 37/065 475/5 |

FOREIGN PATENT DOCUMENTS

| | | | |
|---|---|---|---|
| JP | 2010-038307 A | 2/2010 | |
| KR | 20120028234 A * | 3/2012 | ........... F16H 37/065 |
| WO | WO 97/36116 A1 | 10/1997 | |

OTHER PUBLICATIONS

International Search Report issued in corresponding International Application No. PCT/JP2015/002835, dated Aug. 4, 2015 (2 pages).

\* cited by examiner

ELECTRIC BRAKE ACTUATOR FOR VEHICLES

TECHNOLOGICAL FIELD

The disclosure here generally pertains to vehicle brakes including parking brakes and service brakes. More specifically, the disclosure involves an electric brake actuator for actuating vehicle brakes through motor-operation.

BACKGROUND DISCUSSION

Automotive vehicles commonly include a parking brake which is operable to switch between an engaged state and a disengaged state. Somewhat recently, vehicles have been outfitted with electric parking brakes in which the parking brake is switched between the engaged and non-engaged states through operation of a motor. FIG. 1 schematically illustrates a known electric parking brake arrangement in which a single motor M is used in combination with one or more torque multiplication devices $P_1, P_2 \ldots P_n$ to achieve the desired output for operating the parking brake. The torque multiplication devices are typically in the form of belts, pulleys or a series of gears. The torque multiplication devices increase the torque produced by the motor output, but also reduce the speed.

FIG. 2 illustrates an example of a motor-operated parking brake, sometimes referred to as a motor-on-caliper parking brake. An actuator 12, which includes a motor, is operatively coupled to the brake 10. The caliper portion of the motor-on-caliper converts the rotational motion of the actuator into linear motion. FIG. 2B schematically illustrates a way in which this is accomplished. The actuator 12, under the operation of the motor, rotates a screw (lead screw) 16 which causes linear movement of a nut 18. The nut 18 pushes the caliper piston 20. A thrust bearing exists between the caliper and the screw, and allows the screw to rotate even though a relatively large load is being transmitted from the screw into the caliper. In a known manner, the movement of the piston linearly moves a brake pad toward and into contact with the brake rotor. Another brake pad opposes the one brake pad and contacts the opposite side of the brake rotor. The operation of the actuator 12, including the motor, thus produces a clamping force applied to the brake rotor.

Many known parking brakes utilize a single electric motor to effect operation of the parking brake. This motor must be relatively large to provide the power necessary to achieve the required brake performance. Motors of the size typically used exhibit a relatively low power density compared to smaller motors.

United States Application Publication No. 2003/0205437 proposes an electric brake assembly involving the use of two motors. FIG. 3 schematically illustrates the disclosed arrangement involving the use of spur gear trains $P_1, P_2, P_3$ to produce an output. The drive shaft of one motor $M_1$ engages and rotates the spur gear $P_1$, while the drive shaft of the other motor $M_2$ engages and rotates the spur gear $P_2$. The two spur gears $P_1$, P2 engage and rotate the third spur gear $P_3$. The patent application publication states that the disclosed electric brake assembly permits a more compact design and allows two smaller-diameter motors, which exhibit lower inertia, to be used in place of the a larger-diameter single motor. The gear trains have only one input and one output, and so the speeds of the two motors are forced to be a constant ratio of one another.

SUMMARY

One aspect of the disclosure here involves an electric brake actuator operatively connectable to a vehicle brake to operate the vehicle brake. The electric brake actuator includes a first electric motor having a first motor output shaft rotated by operation of the first electric motor to produce a first driving force and a first motor output gear fixed to the first motor output shaft, a second electric motor having a second motor output shaft rotated by operation of the second electric motor to produce a second driving force and a second motor output gear fixed to the second motor output shaft, an actuator output rotatable about an output axis and operatively connectable to the vehicle brake to operate the vehicle brake, and a differential operatively connected to both the first motor output gear and the second motor output gear and the actuator output to transfer the first and second driving forces to the actuator output by way of the differential. An effective gear ratio between the first motor output gear and the actuator output is different from an effective gear ratio between the second motor output gear and the actuator output.

According to another aspect, an electric brake actuator operatively connectable to a vehicle brake to operate the vehicle brake includes: a first electric motor having a first motor output shaft rotated by operation of the first electric motor to produce a first driving force and a first motor output gear fixed to the first motor output shaft, an actuator output rotatable about an output axis and operatively connectable to the vehicle brake to operate the vehicle brake; and a first cycloidal speed reducer having a first reducer input rotatable about a first reducer axis and operatively connected to the first motor output gear to receive the first driving force, and a first reducer output rotatable about the first reducer axis and operatively connected to the actuator output to transfer the first driving force to the actuator output. The first reducer axis is non-coaxial with both the first motor output shaft and the output axis.

A further aspect of the disclosure here involves an electric brake actuator comprising a first electric motor having a first motor output shaft rotated by operation of the first electric motor to produce a first driving force and a first motor output gear fixed to the first motor output shaft, a second electric motor having a second motor output shaft rotated by operation of the second electric motor to produce a second driving force and a second motor output gear fixed to the second motor output shaft, an actuator output rotatable about an output axis and operatively connectable to the vehicle brake to operate the vehicle brake, and a first cycloidal speed reducer having a first reducer input rotatable about a first reducer axis and operatively connected to the first motor output gear to receive the first driving force and a first reducer output rotatable about the first reducer axis and operatively connected to the actuator output to transfer the first driving force to the actuator output, and a second cycloidal speed reducer having a second reducer input rotatable about a second reducer axis and operatively connected to the second motor output gear to receive the second driving force and a second reducer output rotatable about the second reducer axis and operatively connected to the actuator output to transfer the second driving force to the actuator output.

BRIEF DESCRIPTION OF THE DRAWING FIGURES

Additional features and aspects of the electric brake actuator disclosed here will become more apparent from the following detailed description considered with reference to the accompanying drawing figures in which like elements are designated by like reference numerals.

DETAILED DESCRIPTION

Figure 1:
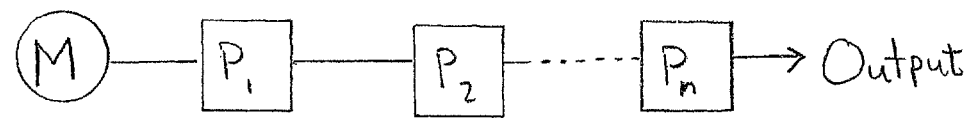
FIG. 1 is a schematic illustration of a known motor assembly used to operate a parking brake.
Figure 3:
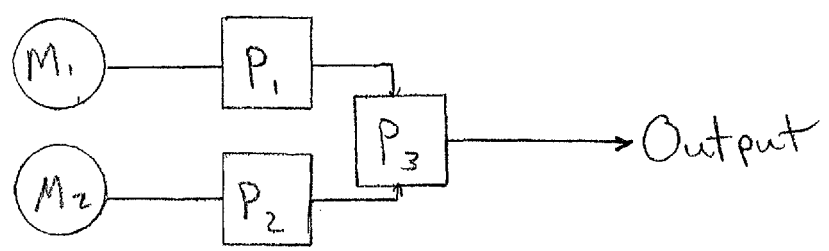
FIG. 3 is a schematic illustration of another known motor assembly used to operate a parking brake.
Figure 2A:
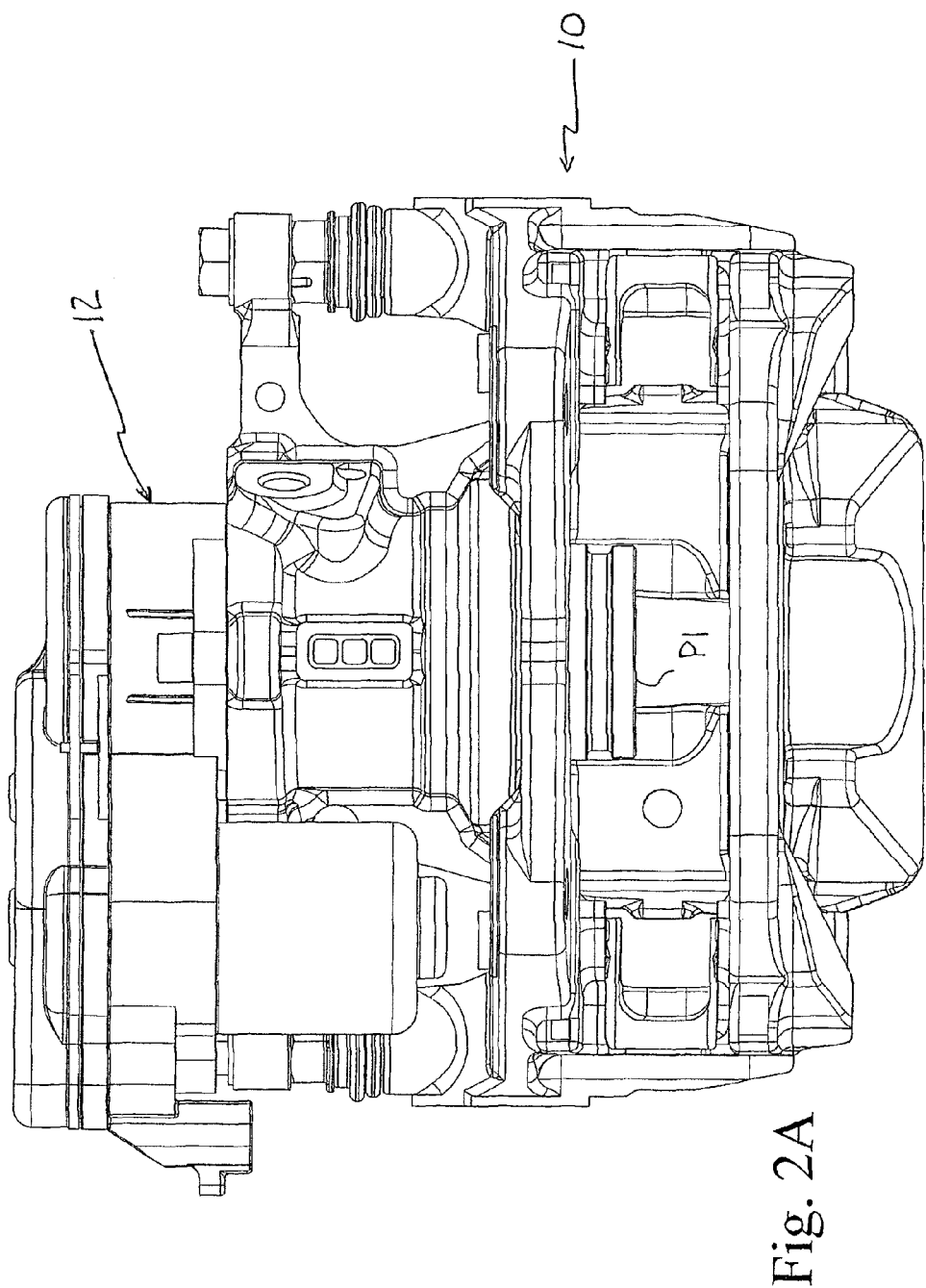
FIG. 2A is a plan view of a known motor-operated parking brake and FIG. 2B is a somewhat schematic illustration of aspects of the parking brake actuated by the motor.
Figure 2B:
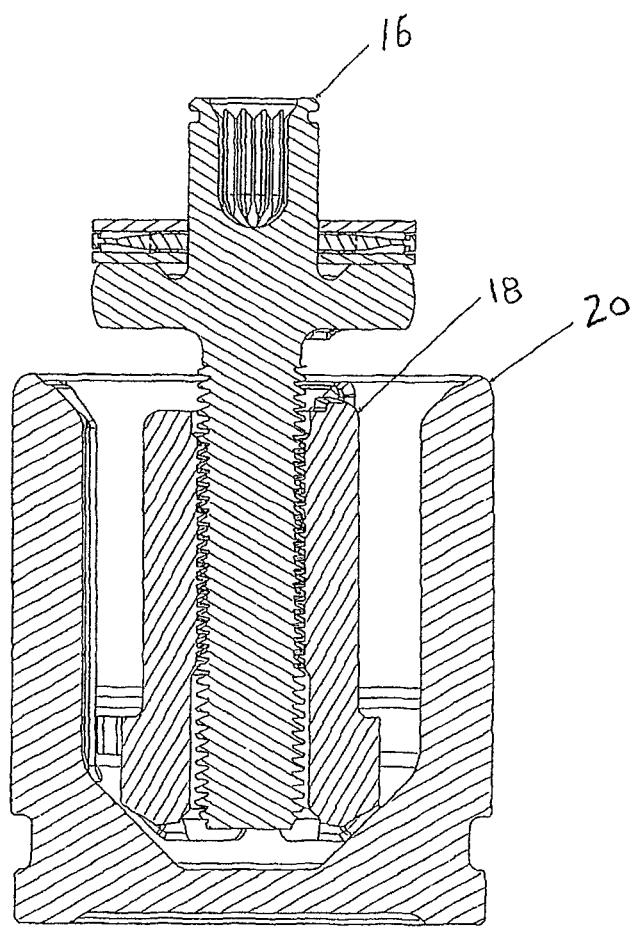

Set forth below is a detailed description the electric brake actuator disclosed here. The electric brake actuator is described and illustrated in terms of several embodiments disclosed as examples of the electric brake actuator. The description which follows describes the actuator used to actuate or operate a parking brake such as the parking brake generally illustrated in FIG. 2, though it is to be understood that the electric brake actuator can also be used to operate or actuate parking brakes of a different type or construction, and can also be used to operate or actuate vehicle service brakes (i.e., the brakes used during normal vehicle driving).

Figure 4:
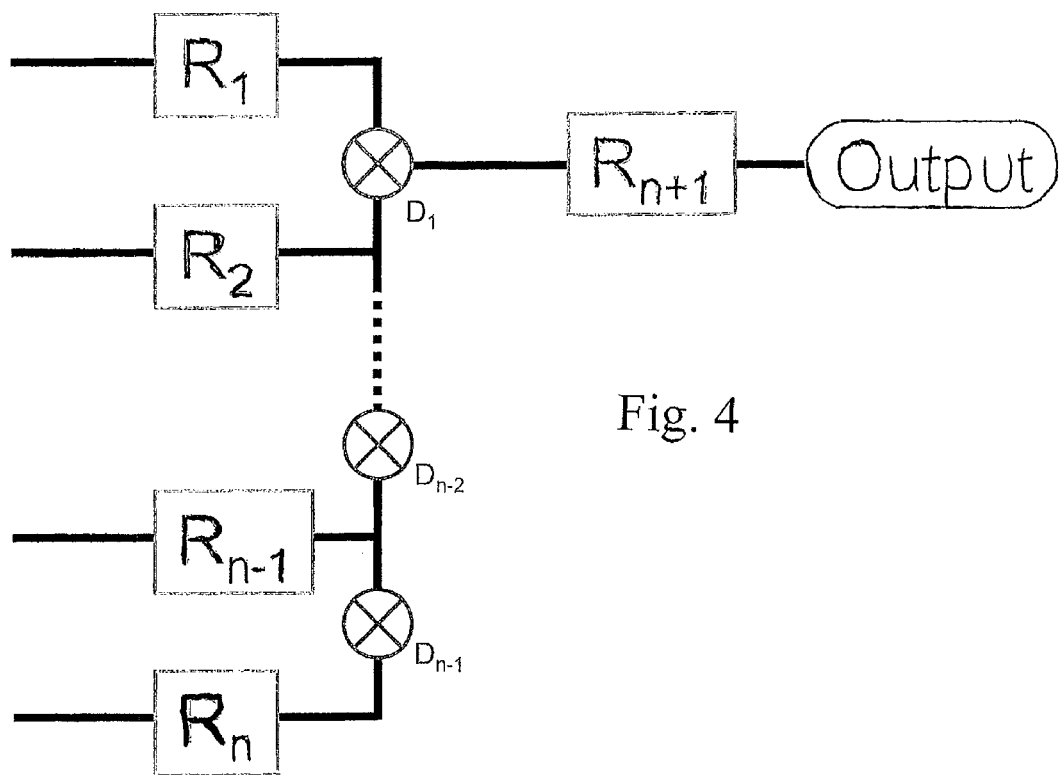
FIG. 4 is a schematic illustration of the electric brake actuator disclosed here.

FIG. 4 is a schematic illustration of the electric brake actuator disclosed here. Generally speaking, the electric brake actuator includes a plurality of motors $M_1$, $M_2$, $M_{n-1}$, $M_n$ in combination with a plurality of torque multiplication devices $R_1$, $R_2$, $R_{n-1}$, $R_n$ and a plurality of differentials $D_1$, $D_{n-2}$, $D_{n-1}$, which can also serve as power combining devices. The torque output by each of the respective motors $M_1$, $M_2$, $M_{n-1}$, $M_n$ is increased by the torque multiplication devices $R_1$, $R_2$, $R_{n-1}$, $R_n$, and the increased torque is then combined at the differentials $D_1$, $D_{n-2}$, $D_{n-1}$. The resulting combined torque can be subjected to further torque multiplication by the torque multiplication device $R_{n+1}$ to produce an output that is used to operate the parking brake.

Figure 5:
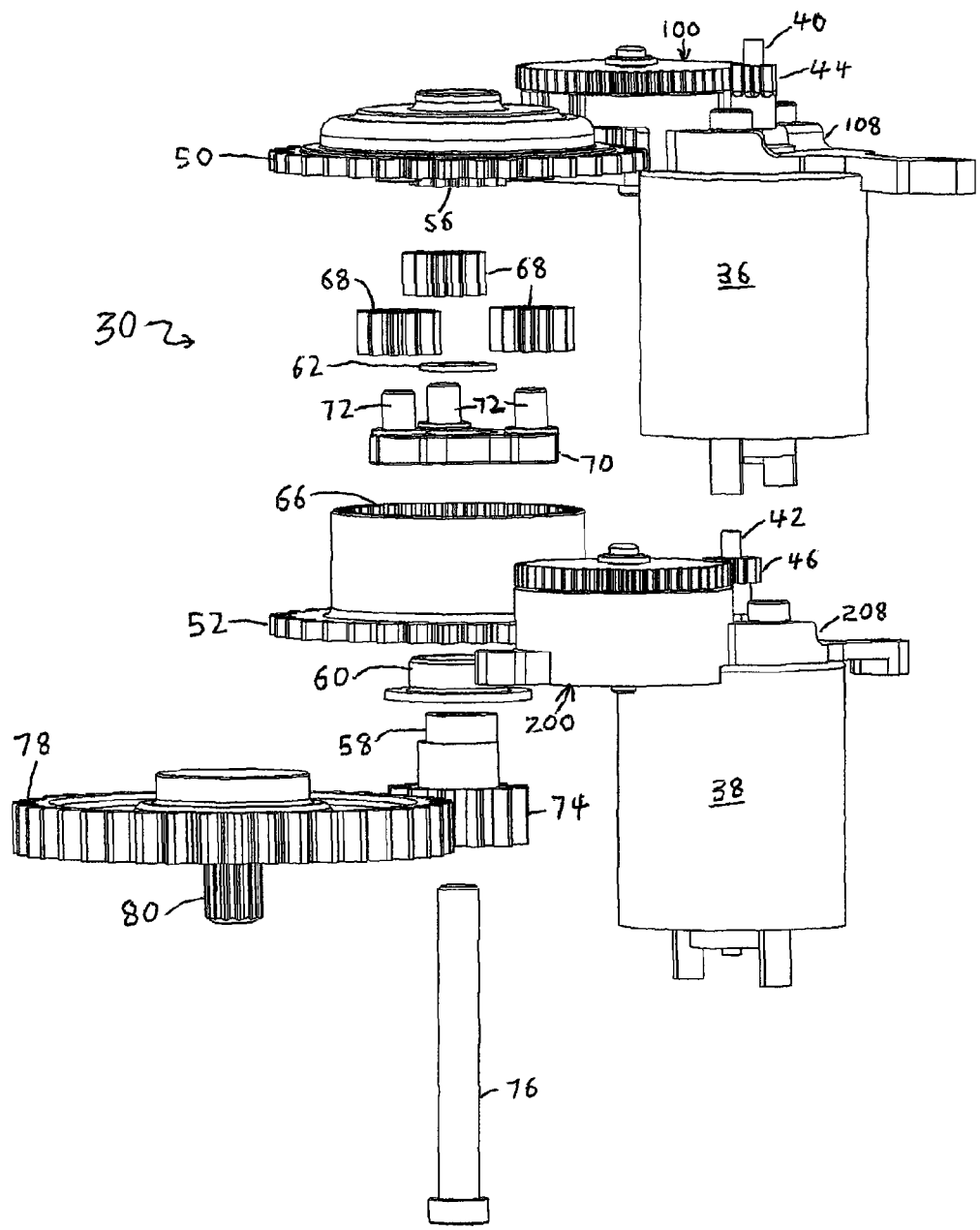
FIG. 5 is an exploded view of the electric brake actuator disclosed here according to a first embodiment disclosed by way of example.
Figure 6:
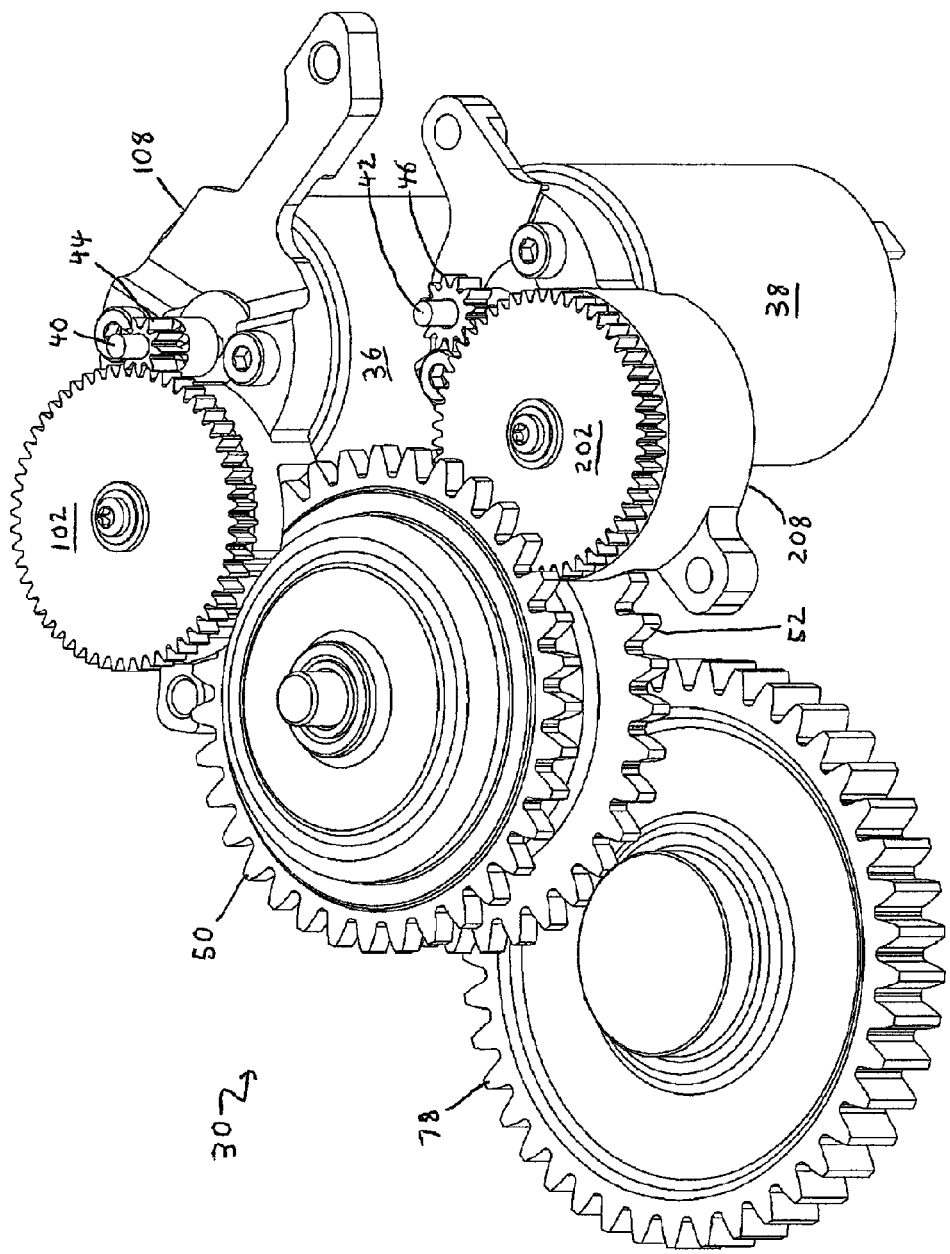
FIG. 6 is a top perspective view of the electric brake actuator shown in FIG. 5.
Figure 7:
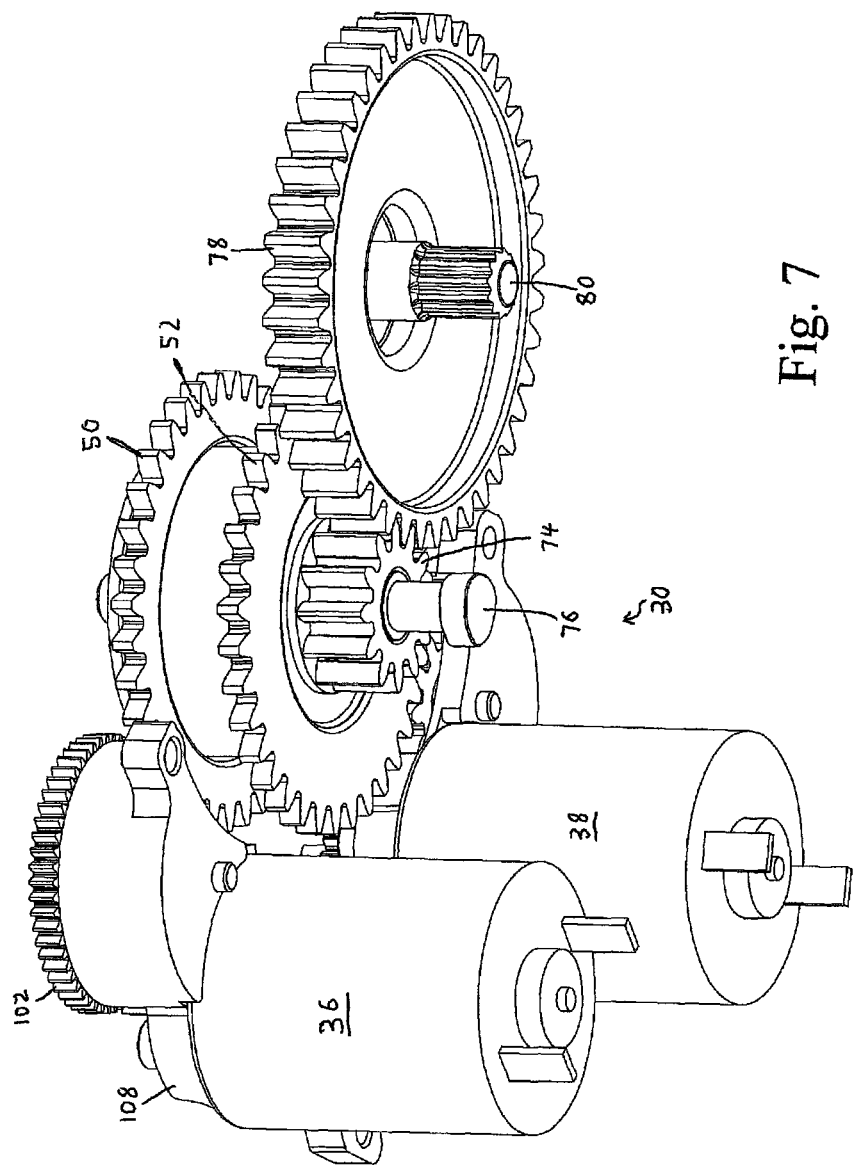
FIG. 7 is a bottom perspective view of the electric brake actuator shown in FIG. 5.

FIGS. 5-7 illustrate an example of one possible arrangement for the electric brake actuator disclosed here and generally illustrated in FIG. 4. Referring to FIGS. 5-7, this embodiment of the electric brake actuator 30 disclosed by way of example includes a housing (not shown) having an interior in which is positioned the illustrated features of the electric brake actuator, except for the actuator output, and is operatively connected to a vehicle brake to operate the vehicle brake.

The electric brake actuator 30 includes a first electric motor 36 and a second electric motor 38 positioned in the housing interior. The first electric motor 36 has a first motor output shaft 40 rotated by operation of the first electric motor 36 to produce a first driving force and a first motor output gear 44 fixed to the first motor output shaft. The second electric motor 38 has a second motor output shaft 42 rotated by operation of the second electric motor 38 to produce a second driving force and a second motor output gear 46 fixed to the second motor output shaft 42.

The first motor output gear 44 is operatively connected to a input of a first cycloidal speed reducer 100 to transfer the first driving force thereto, and the second motor output gear 46 is connected to an input of a second cycloidal speed reducer 200 to transfer the second driving force thereto. An output of the first cycloidal speed reducer 100 is operatively connected to a first intermediate gear 50 to transfer the first driving force to the first intermediate gear 50, and an output of the second cycloidal speed reducer 200 is operatively connected to a second intermediate gear 52 to transfer the second driving force to the second intermediate gear 52. The first and second cycloidal speed reducers 100, 200 will be discussed in further detail below.

The electric actuator also includes a differential formed, by way of example, by a planetary gear set having a plurality of planet gears 68 rotatably mounted to a common carrier 70 by way of respective mounting pins 72. In the embodiment, the mounting pins 72 are integral with the common carrier 70. As will be discussed in further detail below, the differential is operatively connected to the first motor output gear 44 by way of the first cycloidal speed reducer 100 such that the first driving force is transferred from the first motor output gear 44 to the differential by way of the first cycloidal speed reducer 100, and is operatively connected to the second motor output gear 46 by way of the second cycloidal speed reducer 200 such that the second driving force is transferred from the second motor output gear 46 to the differential by way of the second cycloidal speed reducer 200.

In the embodiment, a differential output gear 74 serves as the differential output and is fixed to the common carrier 70 so that rotation of the common carrier 70 results in rotation of the differential output gear 74. By way of example, a shaft 58 which is integral with the differential output gear 74 is fixed, such as press fit, into an opening in the common carrier 70. A bearing 60 is press fit into the second intermediate gear 52 and supports the shaft 58 so the shaft 58 can rotate relative to the second intermediate gear 52.

In the embodiment, the differential output gear 74 is operatively connected to an actuator output 80, by way of example, by a reduction gear 78, to thereby transfer the first and second driving forces to the actuator output 80 by way of the differential. The actuator output 80 is operatively connectable to the vehicle brake to operate the vehicle brake, by way of example, by engaging the screw 16 (lead screw assembly) shown in FIG. 2 to effect operation of the parking brake. The reduction gear 78, which can be configured to provide further gear reduction and torque multiplication, is fixed to the actuator output 80 so that the rotation transferred to the reduction gear 78 results in rotation of the actuator output 80 about an output axis.

In the embodiment, the differential also includes a sun gear 56 meshed with the plurality of planet gears 68 and a ring gear 66 meshed with the plurality of planet gears 68. The first intermediate gear 50 is fixed to the sun gear 56 so that the first intermediate gear 50 and the sun gear 56 rotate together as a unit, and the second intermediate gear 52 is fixed to the ring gear 66 so that the second intermediate gear 52 and the ring gear 66 rotate together as a unit. The first motor output gear 44 is thus operatively connected to the sun gear 56 by way of the first cycloidal speed reducer 100 and the first intermediate gear 50 to transfer the first driving force to the sun gear 56, and the second motor output gear 46 is thus operatively connected to the ring gear 66 by way of the second cycloidal speed reducer 200 and the second intermediate gear 52 to transfer the second driving force to the ring gear 66. Additionally, a fixing pin 76 is fitted through concentric openings in the shaft 58/differential output gear 74, spacer bearing 60, a washer 62 provided on the side of the common carrier 70 facing the planet gears 68, and first intermediate gear 50/sun gear 56, to hold together the planetary gear set.

In the embodiment, three planet gears 68 mesh with the sun gear 56 and the ring gear 66. During operation, the first driving force is transferred to the sun gear 56 while the second driving force is transferred to the ring gear 66. The combined rotation of the sun gear 56 and the ring gear 66 is transferred to the planetary gear unit formed by the planet gears 68 mounted on the common carrier 70. This in turn results in rotation of the differential output gear 74 which in turn drives the actuator output 80 by way of the reduction gear 78. The planetary gear set formed by the sun gear 56, the ring gear 66 and the planet gears 68 mounted on the common carrier 70 thus operate as a differential operatively connected to the differential output gear 74 and to both the first motor output shaft 40 of the first electric motor 36 and the second motor output shaft 42 of the second electric motor 38 to transfer the driving forces or torque produced by each motor to the differential output gear 74 by way of the differential. The differential allows the motors 36, 38 to operate at speeds which are independent of one another.

Figure 8:
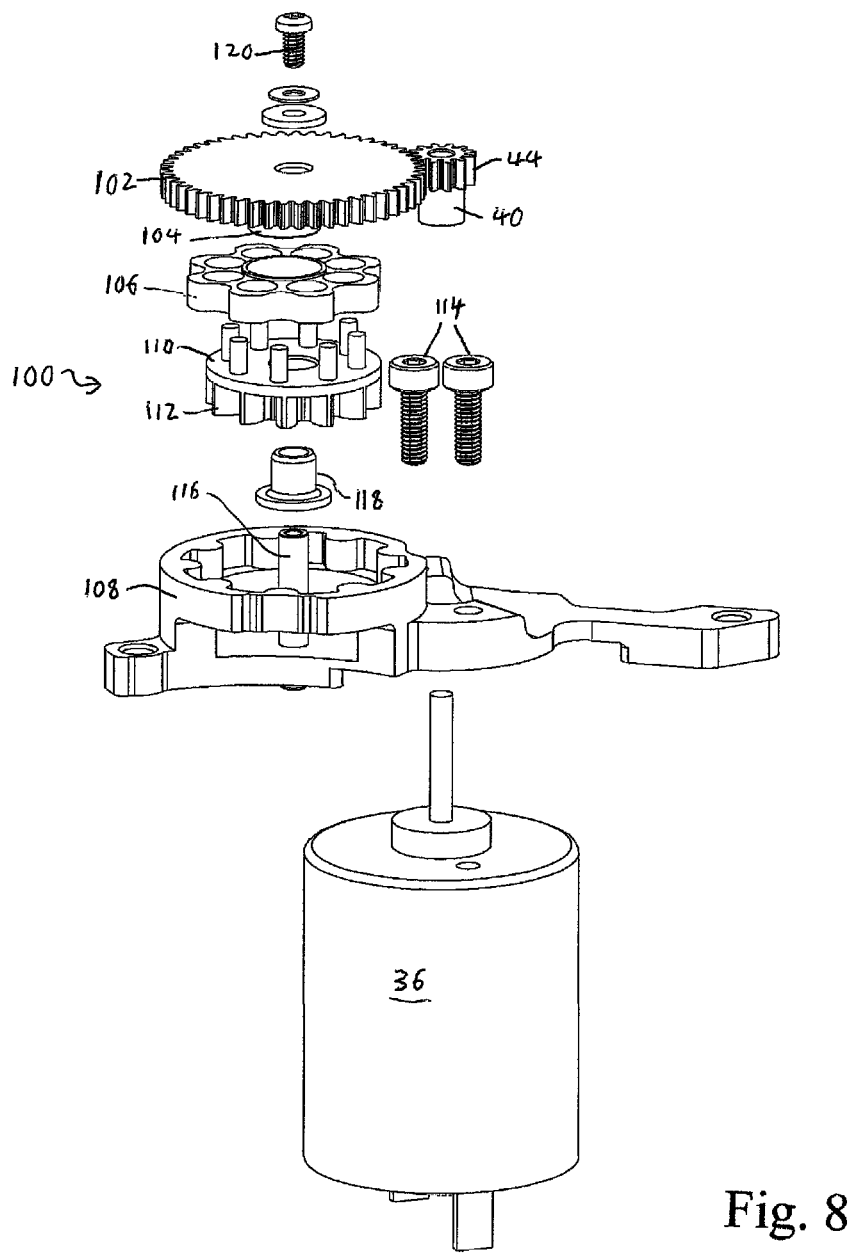
FIG. 8 is an exploded view of a cycloidal structure disclosed by way of example in the electric brake actuator shown in FIG. 5.
Figure 9:
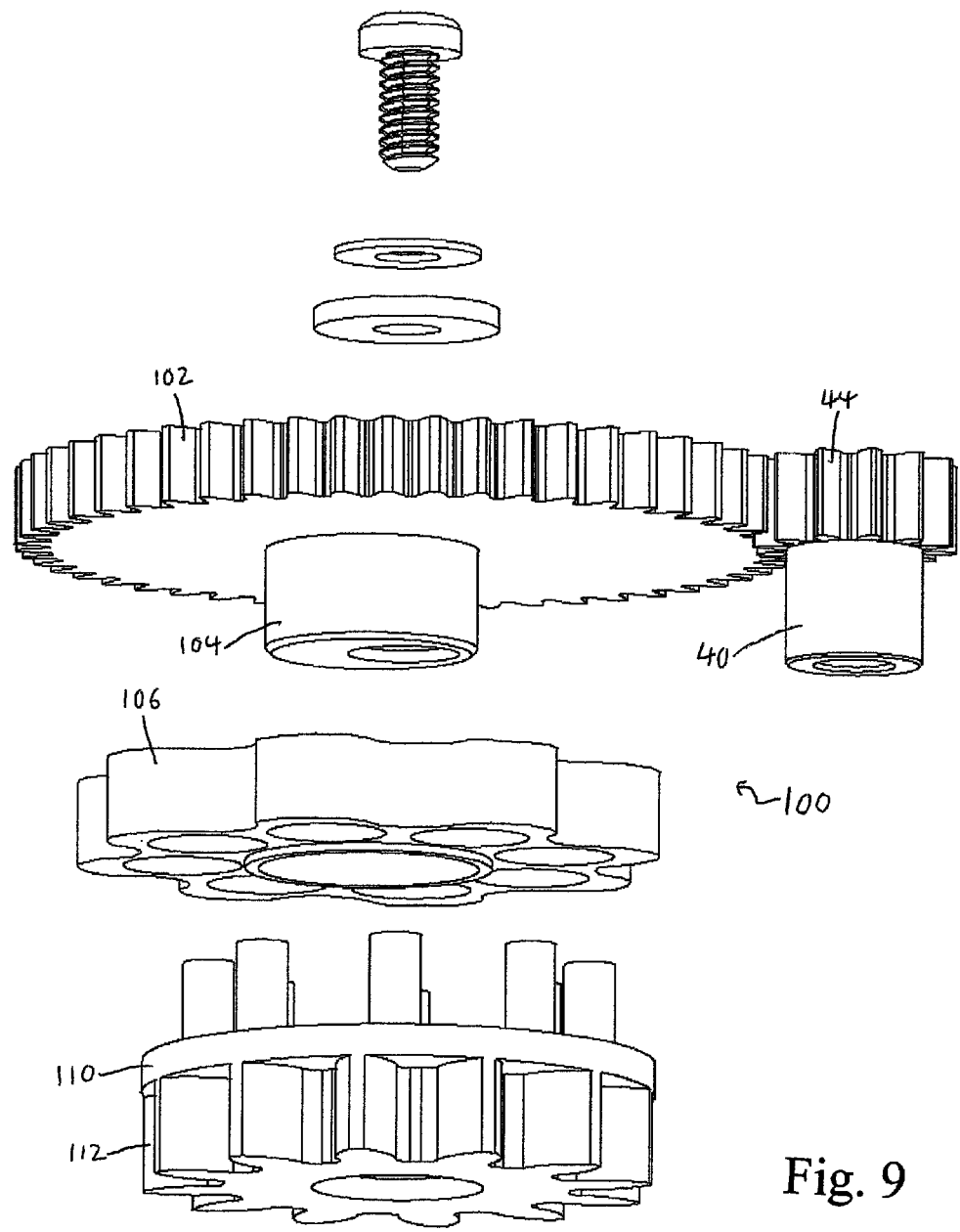
FIG. 9 is an exploded view from a different angle of portions of the cycloidal structure shown in FIG. 8.

The first cycloidal speed reducer 100 is illustrated in more detail in FIGS. 8 and 9. In the first cycloidal speed reducer 100, a first reducer input gear 102 is fixed to a first eccentric 104 so that the first reducer input gear 102 and the first eccentric 104 rotate together as a unit about a first reducer axis. The first electric motor 36 and the first cycloidal speed reducer 100 are relatively positioned such that the first motor output gear 44 meshes with the first reducer input gear 102. The first reducer input gear 102 and the first eccentric 104 therefore serve as a first reducer input operatively connected to the first motor output gear 44 to receive the first driving force.

The first cycloidal speed reducer 100 further includes a first input disc 106 configured to be driven by the first eccentric 104 in a cycloidal motion within a first reducer housing 108. In particular, the first input disc 106 includes an opening within which the first eccentric 104 rotates, and plurality of protrusions which mesh with a plurality of recesses in the first reducer housing 108. The number of recesses in the first reducer housing 108 is greater than the number of protrusions in the first input disc 106. The combination of the eccentric motion of the first input disc 106 caused by the rotation of the first eccentric 104 and the meshing of the protrusions on the first input disc 106 with the greater number of recesses in the first reducer housing 108 causes a cycloid rotation to be imparted to the first input disk 106 when the first reducer input gear 102, and thus the first eccentric 104, are caused to rotate by rotation of the first motor output gear 44.

The first cycloidal speed reducer 100 further includes a first output disc 110. The cycloid motion of the first input disc 106 causes the first output disc 110 to rotate by mutual engagement of a plurality of pins within a plurality of holes which are larger than the plurality of pins. The pins and holes are each arranged in a circular pattern, and are sized such that the pins and holes will move in loops relative to each other in a manner which causes the first output disc 110 to rotate about the first reducer axis in steady, non-cycloidal rotation. In the embodiment, the plurality of pins are provided on the first output disc 110 and the plurality of holes are provided on the first input disc 106. However, the plurality of holes could also be provided on the first output disc 110, with the plurality of pins being provided on the first input disc 106.

The first output disc 110 is fixed to a first reducer output gear 112 such that they rotate together as a unit about the first reducer axis. The differential and the first cycloidal speed reducer 100 are relatively positioned such that the first reducer output gear 112 meshes with the first intermediate gear 50. The first output disc 110 and the first reducer output gear 112 therefore serve as a first reducer output rotatable about the first reducer axis and operatively connected to the first intermediate gear 50 and thus to the sun gear 56 fixed to the first intermediate gear 50 and, by way of the differential, the actuator output 80, to transfer the first driving force to the first intermediate gear 50 and thus to the sun gear 56 fixed to the first intermediate gear 50, and, by way of the differential, the actuator output 80.

In the embodiment, the first electric motor 36 is mounted to the first reducer housing 108 by way of, for example, screws 114, to assist in disposing the first electric motor 36 in the proper position relative to the first cycloidal speed reducer 100. As illustrated in FIG. 8, a reducer shaft 116 fixed to the reducer housing 108, a reducer bearing 118 disposed on the reducer shaft 116 between the portion of the reducer housing 108 from which the reducer shaft 116 protrudes, and a reducer screw 120 in threaded engagement with the free end of the reducer shaft 116 serve to hold and position the components of the first cycloidal speed reducer 100, and also to define the first reducer axis.

In the embodiment, the second cycloidal speed reducer 200 is identical to the first cycloidal speed reducer 100 (by way of example, the second cycloidal speed reducer 200 includes a second reducer input gear 202 rotatable within a second reducer housing 208 about a second reducer axis) and so a detailed description of the rest of its structure is not repeated. The first and second reducer housings 108, 208 are fixed to or integral with the actuator housing.

The second cycloidal speed reducer 200 is positioned relative to the second electric motor 38 such that the second motor output gear 46 meshes with the second reducer input gear 202 of the second cycloidal speed reducer 200. The second cycloidal speed reducer 200 is positioned relative to the differential such that the second reducer output gear meshes with the second intermediate gear 52. The second cycloidal speed reducer thus includes a second reducer output rotatable about the second reducer axis and operatively connected to the second intermediate gear 52 and thus to the ring gear 66 fixed to the second intermediate gear 52 and, by way of the differential, the actuator output 80, to transfer the second driving force to the second intermediate gear 52, and thus to the ring gear 66 fixed to the second intermediate gear 52, and, by way of the differential, the actuator output 80.

The first and second cycloidal speed reducers 100 and 200 multiply the torque produced by the first and second electric motors 36, 38. The increased torque is then combined by way of a power combining device having multiple inputs and a common output. In this embodiment, the planetary gear set including the sun gear 56, the ring gear 66 and the planet gears 68 mounted on the common carrier 70 forms the power combining device. In other words, the sun gear 56, the ring gear 66 and the planet gears 68 combine the torque produced by rotation of the first and second motor output shafts 40 and 42 to produce a combined torque which is applied to the differential output gear 74 to rotate the differential output gear, while at the same time allowing the first and second electric motors 36, 38 to rotate at speeds independent of one another.

In the embodiment, the gear train between and including the first motor output gear 44 and the first intermediate gear 50 is equivalent to the gear train between and including the second motor output gear 46 and the second intermediate gear 52. Thus, the effective gear ratio between the first motor output gear 44 and the first intermediate gear 50 is equal to the effective gear ratio between the second motor output gear 46 and the second intermediate gear 52. However, because the effective gear ratio though the planetary gear set between the sun gear 56 to which the first intermediate gear 50 is fixed and the differential output gear 74 (and thus the actuator output 80) is different from the effective gear ratio though the planetary gear set between the ring gear 66 to which the second intermediate gear 52 is fixed and the differential output gear 74 (and thus the actuator output 80), the effective gear ratio between the first motor output gear 44 and the differential output gear 74 (and thus the actuator output 80) is different from the effective gear ratio between the second motor output gear 46 and the differential output gear 74 (and thus the actuator output 80).

By providing for the effective gear ratio between the first motor output gear 44 and the differential output gear 74 (and thus the actuator output 80) to be different from the effective gear ratio between the second motor output gear 46 and the differential output gear 74 (and thus the actuator output 80), the first and second electric motors 36, 38 themselves effectively function with different gear ratios. This allows the actuator to meet a two part performance specification with less power than would be needed with only one gear ratio. Different effective gear ratios can also be provided in alternative embodiments which use a differential in which the effective gear ratio is the same for both inputs, such as arrangement in which two identical spur gears operatively connected to the respective motors mesh with a spur gear differential. In such an arrangement, the different effective gear ratios can be provided by, for example, using differently sized intermediate gears in each of the gear trains between the respective motors and the respective spur gears.

The cycloidal speed reducer 100 (and, by extension, the cycloidal speed reducer 200) has a much higher efficiency when driven by the first input disc 106 than the first output disc 110. This allows more torque to be applied to the ring gear than the motor with the small gear ratio is able to generate by itself, keeping the motor with the small effective gear ratio from being caused to rotate backwards by the motor with the large gear ratio, which would limit the output torque of the actuator. Instead, the torque from the motor with the smaller gear ratio is supplemented with torque generated by friction in the cycloidal speed reducer to prevent the motor from the smaller gear ratio from rotating backwards and allow the motor with the larger torque ratio to reach its full torque output.

In an electric brake actuator having the configuration discussed above, the rotational axes of the first and second reducers (i.e., the first reducer axis and the second reducer axis discussed above) are non-coaxial with each other, and are also each non-coaxial with the first motor output shaft 40, the second motor output shaft 42, and the axis of rotation of the actuator output 80 (i.e., the output axis discussed above). The cycloidal speed reducers 100 and 200 generate large radial forces, and by providing for their rotational axes to be unique and not shared with any other component (i.e., the motors 36, 38 and the actuated screw 16/nut 18/piston 20 arrangement), the large radial forces are not transmitted to the other components and bearings are not needed to support those components.

Figure 10:
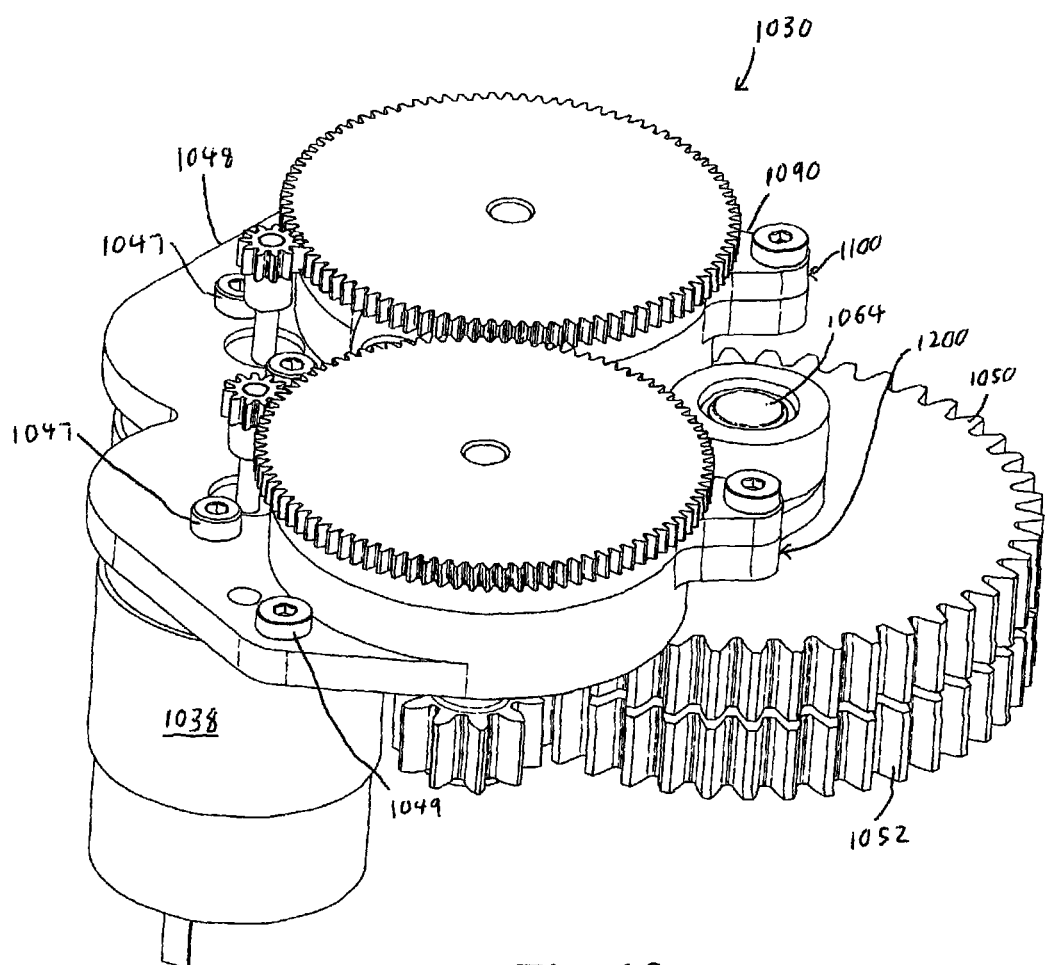
FIG. 10 is a top perspective view of the electric brake actuator disclosed here according to a second embodiment disclosed by way of example.
Figure 11:
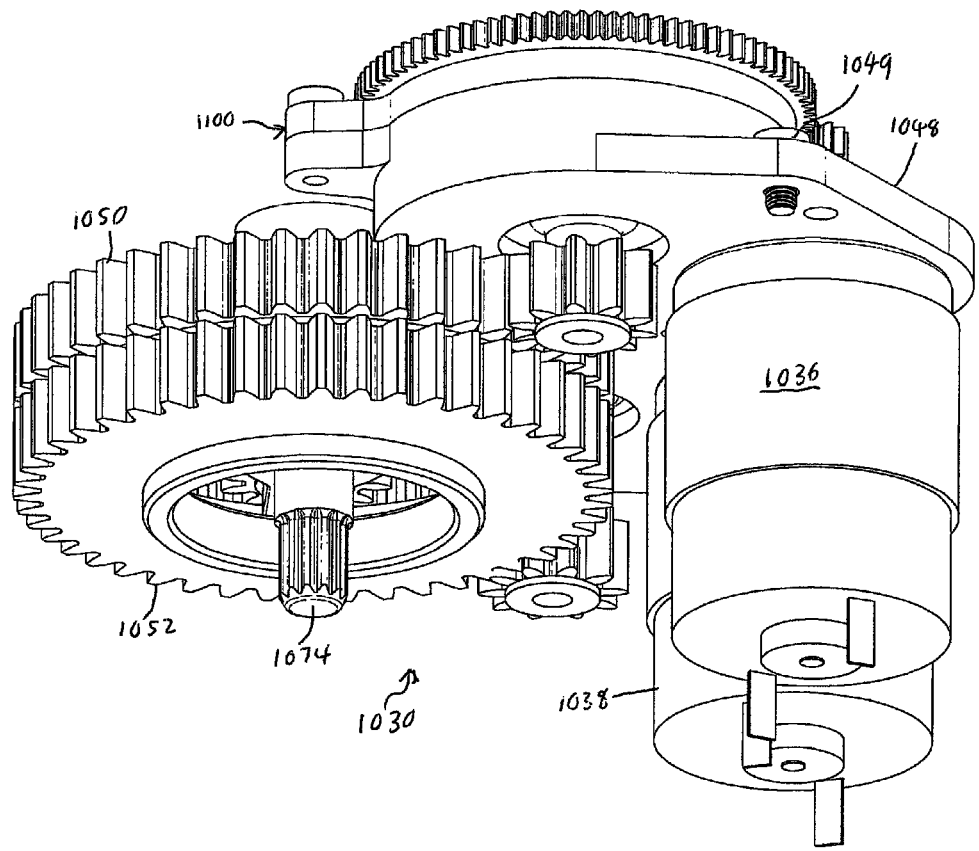
FIG. 11 is a bottom perspective view of the electric brake actuator shown in FIG. 10.

FIGS. 10 and 11 illustrate an example of another possible arrangement for the electric brake actuator disclosed here and generally illustrated in FIG. 4. Referring to FIGS. 10 and 11, this embodiment of the electric brake actuator 1030 disclosed by way of example includes a housing (not shown) having an interior in which is positioned the illustrated features of the electric brake actuator, except for the actuator output, and is operatively connected to a vehicle brake to operate the vehicle brake.

Figure 12:
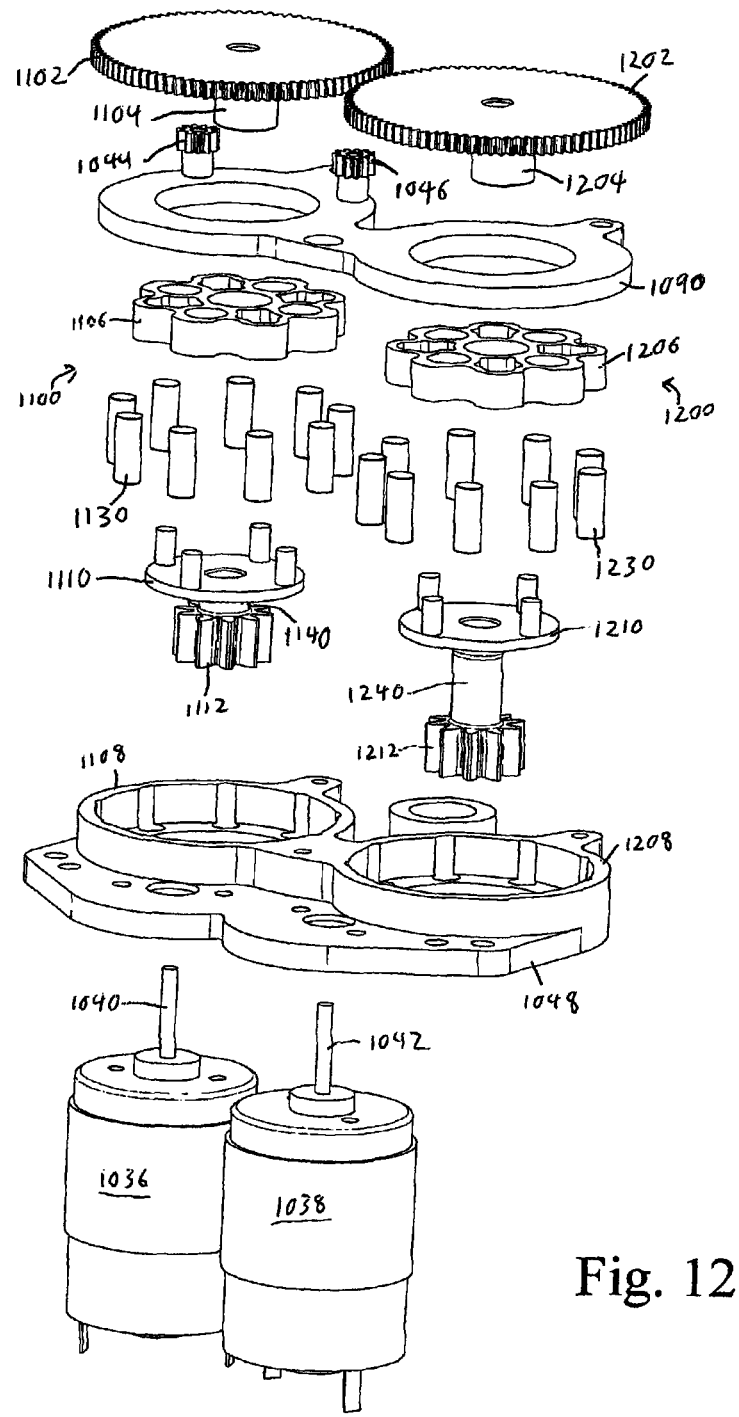
FIG. 12 is an exploded view of a cycloidal structure disclosed by way of example in the electric brake actuator shown in FIG. 10.

The electric brake actuator 1030 includes a first electric motor 1036 and a second electric motor 1038 positioned in the housing interior. As illustrated in FIG. 12, the first electric motor 1036 has a first motor output shaft 1040 rotated by operation of the first electric motor 1036 to produce a first driving force and a first motor output gear 1044 fixed to the first motor output shaft. The second electric motor 1038 has a second motor output shaft 1042 rotated by operation of the second electric motor 1038 to produce a second driving force and a second motor output gear 1046 fixed to the second motor output shaft 1042. As also illustrated in FIG. 12, in the embodiment, the first and second electric motors 1036 and 1038 are mounted side-by-side on a mount 1048, with the first and second electric motors 1036 and 1038 on a bottom side relative to the mount 1048, the first and second motor output shafts 1040 and 1042 projecting through openings in the mount 1048, and the first and second motor output gears 1044 and 1046 on a top side relative to the mount 1048. In the embodiment, the mount 1048 is attached to the actuator housing by screws 1049, and the first and second electric motors 1036 and 1038 are attached to the mount 1048 by screws 1047, as illustrated in FIGS. 10 and 11.

The first motor output gear 1044 is operatively connected to a input of a first cycloidal speed reducer 1100 to transfer the first driving force thereto, and the second motor output gear 1046 is connected to an input of a second cycloidal speed reducer 1200 to transfer the second driving force thereto. An output of the first cycloidal speed reducer 1100 is operatively connected to a first intermediate gear 1050 to transfer the first driving force to the first intermediate gear 1050, and an output of the second cycloidal speed reducer 1200 is operatively connected to a second intermediate gear 1052 to transfer the second driving force to the second intermediate gear 1052. The first and second cycloidal speed reducers 1100, 1200 will be discussed in further detail below.

Figure 14:
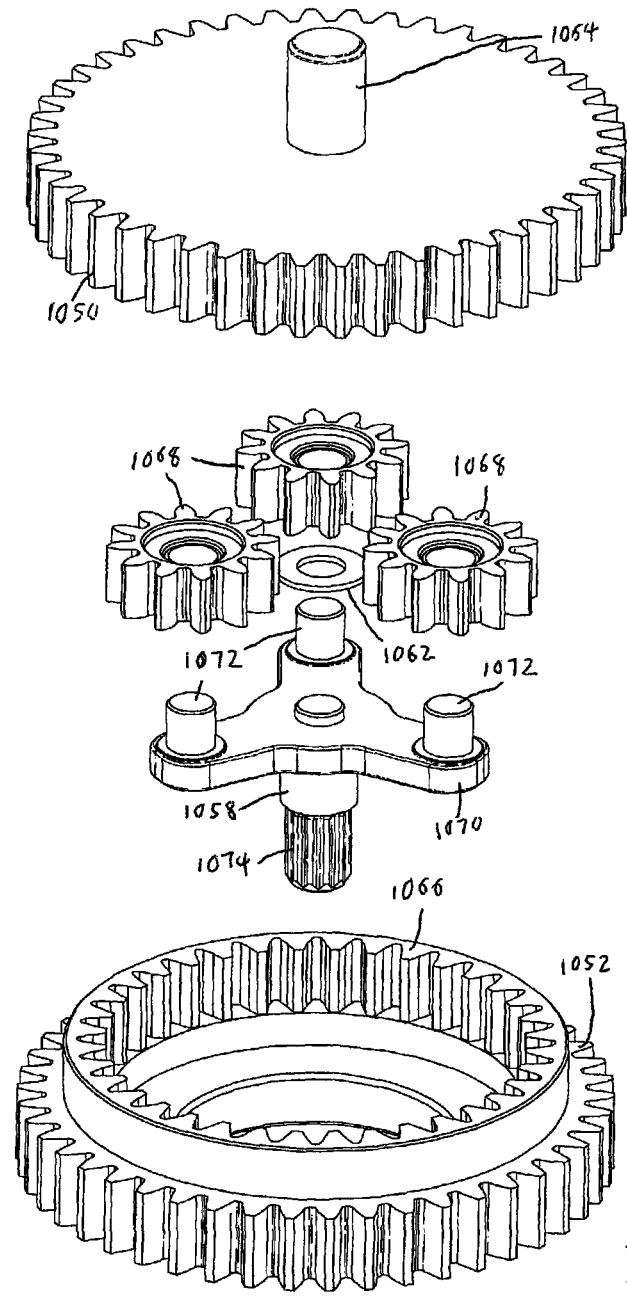
FIG. 14 is an exploded view of a differential disclosed by way of example in the electric brake actuator shown in FIG. 10.
Figure 15:
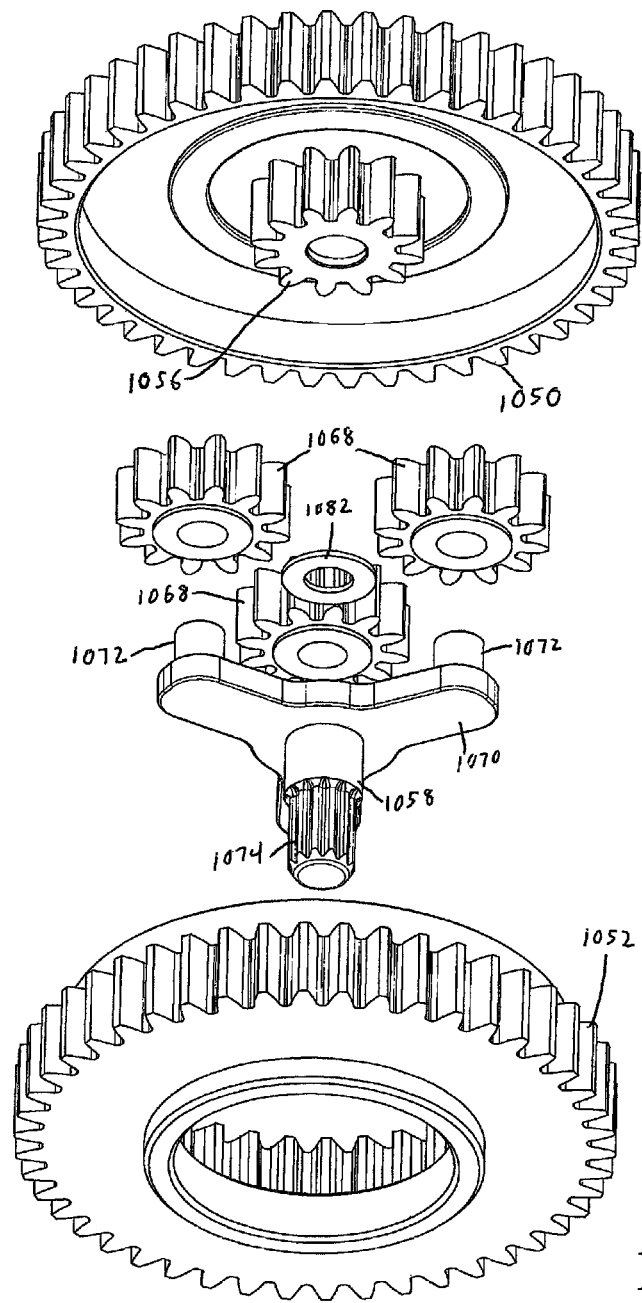
FIG. 15 is an exploded view from a different angle of the differential shown in FIG. 14.

The electric actuator also includes a differential formed, by way of example, by a planetary gear set illustrated by way of example in FIGS. 14 and 15 and having a plurality of planet gears 1068 rotatably mounted to a common carrier 1070 by way of respective mounting pins 1072. In the embodiment, the mounting pins 1072 are integral with the common carrier 1070. As will be discussed in further detail below, the differential is operatively connected to the first motor output gear 1044 by way of the first cycloidal speed reducer 1100 such that the first driving force is transferred from the first motor output gear 1044 to the differential by way of the first cycloidal speed reducer 1100, and is operatively connected to the second motor output gear 1046 by way of the second cycloidal speed reducer 1200 such that the second driving force is transferred from the second motor output gear 1046 to the differential by way of the second cycloidal speed reducer 1200.

In the embodiment, a differential output spline 1074 serves as the differential output and is fixed to the common carrier 1070 so that rotation of the common carrier 1070 results in rotation of the differential output spline 1074. In the embodiment, a shaft 1058 which is integral with the differential output spline 1074 is integral with the common carrier 1070, but could be, for example, press fit into an opening in the common carrier 1070. In the embodiment, the differential output spline 1074 serves as an actuator output operatively connectable to the vehicle brake to operate the vehicle brake, by way of example, by engaging the screw 16 (lead screw assembly) shown in FIG. 2 to effect operation of the parking brake.

In the embodiment, the differential also includes a sun gear 1056 meshed with the plurality of planet gears 1068 and a ring gear 1066 meshed with the plurality of planet gears 1068. The first intermediate gear 1050 is fixed to the sun gear 1056 so that the first intermediate gear 1050 and the sun gear 1056 rotate together as a unit, and the second intermediate gear 1052 is fixed to the ring gear 1066 so that the second intermediate gear 1052 and the ring gear 1066 rotate together as a unit. The first motor output gear 1044 is thus operatively connected to the sun gear 1056 by way of the first cycloidal speed reducer 1100 and the first intermediate gear 1050 to transfer the first driving force to the sun gear 1056, and the second motor output gear 1046 is thus operatively connected to the ring gear 1066 by way of the second cycloidal speed reducer 1200 and the second intermediate gear 1052 to transfer the second driving force to the ring gear 1066. Additionally, a shaft 1064 which projects from the top side of the first intermediate gear 1050 along the rotational axis is received in a bearing in an opening in the mount 1048, and, a washer 1062 is provided on the shaft 1058 on a side of the common carrier 1070 facing the planet gears 1068 and first intermediate gear 1050/sun gear 1056, to separate the sun gear 1056 from the common carrier 1070.

In the embodiment, three planet gears 1068 mesh with the sun gear 1056 and the ring gear 1066. During operation, the first driving force is transferred to the sun gear 1056 while the second driving force is transferred to the ring gear 1066. The combined rotation of the sun gear 1056 and the ring gear 1066 is transferred to the planetary gear unit formed by the planet gears 1068 mounted on the common carrier 1070. This in turn results in rotation of the differential output spline/actuator output 1074. The planetary gear set formed by the sun gear 1056, the ring gear 1066 and the planet gears 1068 mounted on the common carrier 1070 thus operate as a differential operatively connected to the differential output spline/actuator output 1074 and to both the first motor output shaft 1040 of the first electric motor 1036 and the second motor output shaft 1042 of the second electric motor 1038 to transfer the driving forces or torque produced by each motor to the differential output spline/actuator output 1074 by way of the differential. The differential allows the motors 1036, 1038 to operate at speeds which are independent of one another.

Figure 13:
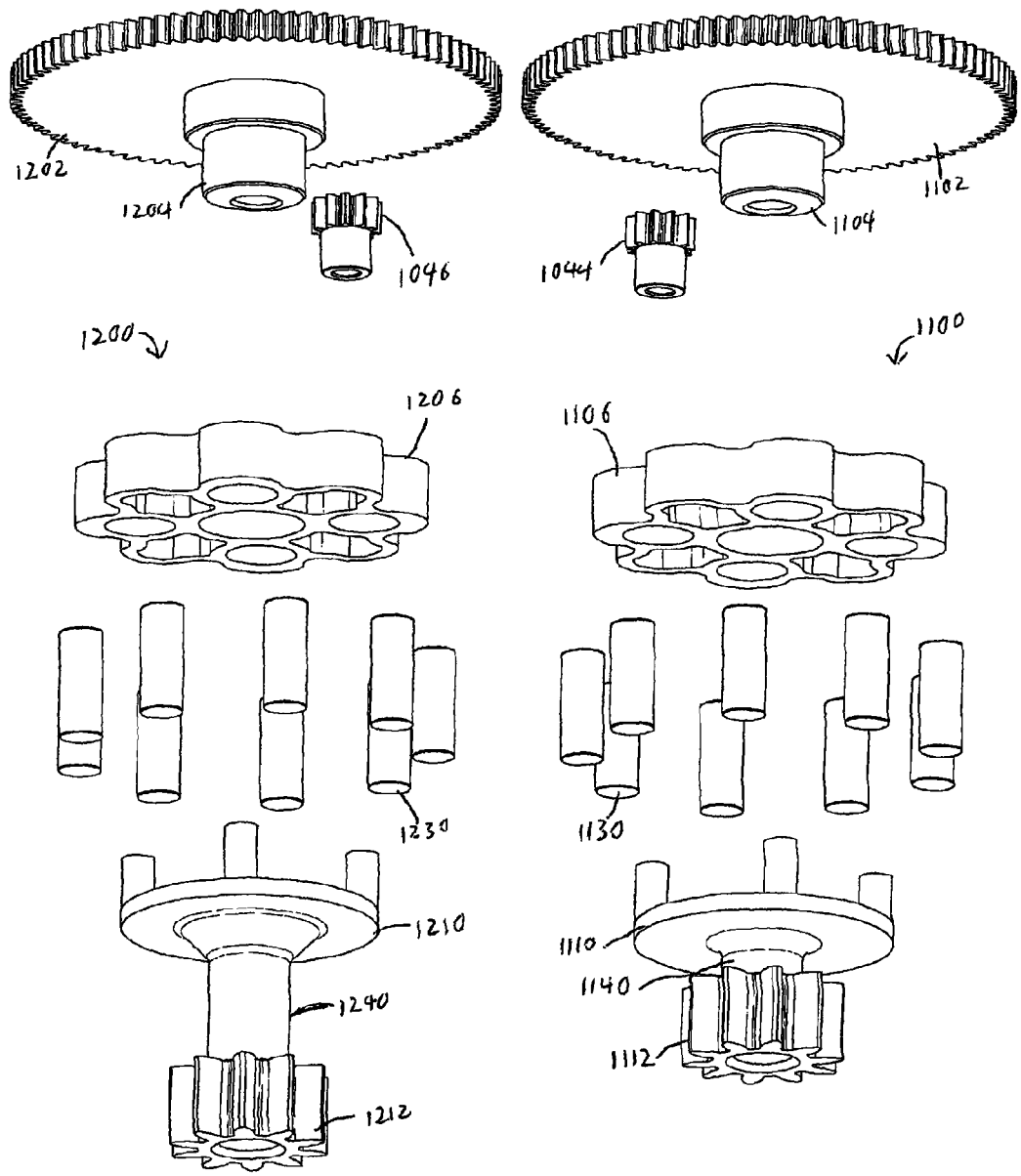
FIG. 13 is an exploded view from a different angle of portions of the cycloidal structure shown in FIG. 12.

The cycloidal speed reducers 1100 and 1200 are illustrated in more detail in FIGS. 12 and 13. In the first cycloidal speed reducer 1100, a first reducer input gear 1102 is fixed to a first eccentric 1104 so that the first reducer input gear 1102 and the first eccentric 1104 rotate together as a unit about a first reducer axis. The first electric motor 1036 and the first cycloidal speed reducer 1100 are relatively positioned such that the first motor output gear 1044 meshes with the first reducer input gear 1102. The first reducer input gear 1102 and the first eccentric 1104 therefore serve as a first reducer input operatively connected to the first motor output gear 1044 to receive the first driving force.

Similarly, in the second cycloidal speed reducer 1200, a second reducer input gear 1202 is fixed to a second eccentric 1204 so that the second reducer input gear 1202 and the second eccentric 1204 rotate together as a unit about a second reducer axis. The second electric motor 1038 and the second cycloidal speed reducer 1200 are relatively positioned such that the second motor output gear 1046 meshes with the second reducer input gear 1202. The second reducer input gear 1202 and the second eccentric 1204 therefore serve as a second reducer input operatively connected to the second motor output gear 1046 to receive the second driving force.

The first cycloidal speed reducer 1100 further includes a first input disc 1106 configured to be driven by the first eccentric 1104 in a cycloidal motion within a first reducer housing 1108. In particular, the first input disc 1106 includes an opening within which the first eccentric 1104 rotates, and a plurality of protrusions which mesh with recesses defined by a plurality of cylinders 1130 press-fit in the first reducer housing 1108. The number of recesses in the first reducer housing 1108 is greater than the number of protrusions in the first input disc 1106. The combination of the eccentric motion of the first input disc 1106 caused by the rotation of the first eccentric 1104 and the meshing of the protrusions on the first input disc 1106 with the greater number of recesses in the first reducer housing 1108 causes a cycloid rotation to be imparted to the first input disk 1106 when the first reducer input gear 1102, and thus the first eccentric 1104, are caused to rotate by rotation of the first motor output gear 1044. The cycloidal speed reducer 1100 has a much higher efficiency when driven by the eccentric 1104 than the first output disc 1110.

The first cycloidal speed reducer 1100 further includes a first output disc 1110. The cycloid motion of the first input disc 1106 causes the first output disc 1110 to rotate by mutual engagement of a plurality of pins within a plurality of holes which are larger than the plurality of pins. The pins and holes are each arranged in a circular pattern, and are sized such that the pins and holes will move in loops relative to each other in a manner which causes the first output disc 1110 to rotate about the first reducer axis in steady, non-cycloidal rotation. In the embodiment, the plurality of pins are provided on the first output disc 1110 and the plurality of holes are provided on the first input disc 1106. However, the plurality of holes could also be provided on the first output disc 1110, with the plurality of pins being provided on the first input disc 1106.

The second cycloidal speed reducer 1200 further includes a second input disc 1206, a second output disc 1210, and a second reducer housing 1208 including recesses defined by a plurality of cylinders 1230 press-fit therein which, in the embodiment, are identical to the first input disc 1106, first output disc 1110, first reducer housing 1108 and plurality of cylinders 1130 of the first cycloidal speed reducer 1100. Additionally, in the embodiment, the first and second reducer housings 1108 and 1208 are defined by portions of the mount 1048 and a mount cover 1090 which is attached to the mount 1048 by fasteners. In particular, as illustrated in FIG. 12, portions of the mount 1048 and mount cover 1090, when the mount cover 1090 is fixed to the mount 1048, define two identical annular spaces in which the cylinders 1130 and 1230 are fixed and in which the input discs 1106 and 1206 are free to rotate in a cycloidal fashion.

The first output disc 1110 is fixed to a first reducer output gear 1112 such that they rotate together as a unit about the first reducer axis. The second output disc 1210 is fixed to a second reducer output gear 1212 such that they rotate together as a unit about the second reducer axis. A shaft 1140 which fixes the first output disc to the first reducer output gear 1112 is shorter than a shaft 1240 which fixes the second output disc 1210 to the second reducer output gear 1212. The lengths of the shafts 1140 and 1240 are selected such that, while the speed reducers 1100 and 1200 are at the same height relative to the planetary gear set, the first reducer output gear 1112 meshes with the first intermediate gear 1050 while the second reducer output gear 1212 meshes with the second intermediate gear 1052.

The first output disc 1110 and the first reducer output gear 1112 therefore serve as a first reducer output rotatable about the first reducer axis and operatively connected to the first intermediate gear 1050 and thus to the sun gear 1056 fixed to the first intermediate gear 1050 and, by way of the differential, the differential output spline/actuator output 1074, to transfer the first driving force to the first intermediate gear 1050 and thus to the sun gear 1056 fixed to the first intermediate gear 1050, and, by way of the differential, the differential output spline/actuator output 1074. Similarly, the second output disc 1210 and the second reducer output gear 1212 therefore serve as a second reducer output rotatable about the second reducer axis and operatively connected to the second intermediate gear 1052 and thus to the ring gear 1066 fixed to the second intermediate gear 1052 and, by way of the differential, the differential output spline/actuator output 1074, to transfer the first driving force to the second intermediate gear 1052 and thus to the ring gear 1066 fixed to the first intermediate gear 1052, and, by way of the differential, the differential output spline/actuator output 1074.

The first and second cycloidal speed reducers 1100 and 1200 multiply the torque produced by the first and second electric motors 1036, 1038. The increased torque is then combined by way of a power combining device having multiple inputs and a common output. In this embodiment, the planetary gear set including the sun gear 1056, the ring gear 1066 and the planet gears 1068 mounted on the common carrier 1070 forms the power combining device. In other words, the sun gear 1056, the ring gear 1066 and the planet gears 1068 combine the torque produced by rotation of the first and second motor output shafts 1040 and 1042 to produce a combined torque which is applied to the differential output spline/actuator output 1074 to rotate the differential output spline, while at the same time allowing the first and second electric motors 1036, 1038 to rotate at speeds independent of one another.

In the embodiment, the gear train between and including the first motor output gear 1044 and the first intermediate gear 1050 is equivalent to the gear train between and including the second motor output gear 1046 and the second intermediate gear 1052. Thus, the effective gear ratio between the first motor output gear 1044 and the first intermediate gear 1050 is equal to the effective gear ratio between the second motor output gear 1046 and the second intermediate gear 1052. However, because the effective gear ratio though the planetary gear set between the sun gear 1056 to which the first intermediate gear 1050 is fixed and the differential output spline/actuator output 1074 is different from the effective gear ratio though the planetary gear set between the ring gear 1066 to which the second intermediate gear 1052 is fixed and the differential output spline/actuator output 1074, the effective gear ratio between the first motor output gear 1044 and the differential output spline/actuator output 1074 is different from the effective gear ratio between the second motor output gear 1046 and the differential output spline/actuator output 1074.

By providing for the effective gear ratio between the first motor output gear 1044 and the differential output spline/actuator output 1074 to be different from the effective gear ratio between the second motor output gear 1046 and the differential output spline/actuator output 1074, the first and second electric motors 1036, 1038 themselves effectively function with different gear ratios. This allows the actuator to meet a two part performance specification with less power than would be needed with only one gear ratio. Different effective gear ratios can also be provided in an alternative embodiment which uses a differential in which the effective gear ratio is the same for both inputs, such as arrangement in which two identical spur gears operatively connected to the respective motors mesh with a spur gear differential. In such an arrangement, the different effective gear ratios can be provided by, for example, using differently sized intermediate gears in each of the gear trains between the respective motors and the respective spur gears.

The first cycloidal speed reducer 1100 has a much higher efficiency when driven by the first eccentric 1104 than the first output disc 1110, and the second cycloidal speed reducer 1200 has a much higher efficiency when driven by the second eccentric 1204 than the second output disc 1210. This allows more torque to be applied to the ring gear than the motor with the small gear ratio is able to generate by itself, keeping the motor with the small effective gear ratio from being caused to rotate backwards by the motor with the large gear ratio, which would limit the output torque of the actuator. Instead, the torque from the motor with the smaller gear ratio is supplemented with torque generated by friction in the cycloidal speed reducer to prevent the motor from the smaller gear ratio from rotating backwards and allow the motor with the larger torque ratio to reach its full torque output.

In an electric brake actuator having the configuration discussed above, the rotational axes of the first and second reducers (i.e., the first reducer axis and the second reducer axis discussed above) are non-coaxial with each other, and are also each non-coaxial with the first motor output shaft 1040 and the second motor output shaft 1042. The cycloidal speed reducers 1100 and 1200 generate large radial forces, and by providing for their rotational axes to be unique and not shared with any other component (i.e., the motors 1036, 1038 and the actuated screw 16/nut 18/piston 20 arrangement), the large radial forces are not transmitted to the other components and bearings are not needed to support those components.

Figure 16:
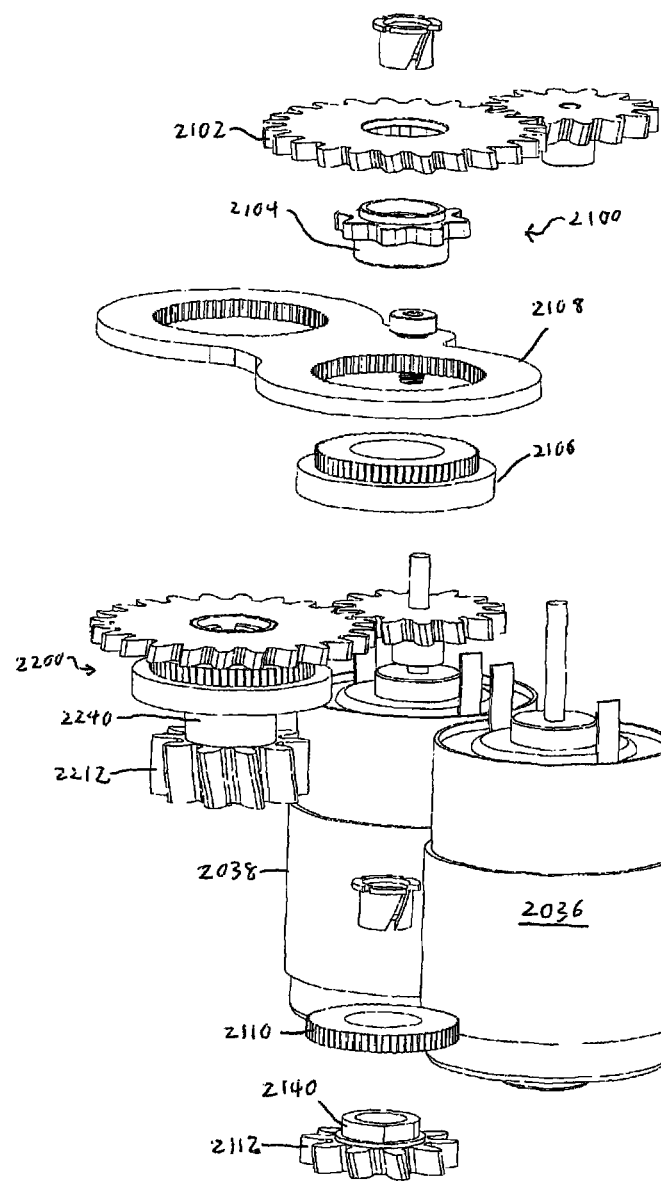
FIG. 16 is an exploded view of an alternative cycloidal structure disclosed by way of example for the electric brake actuator shown in FIG. 10.
Figure 17:
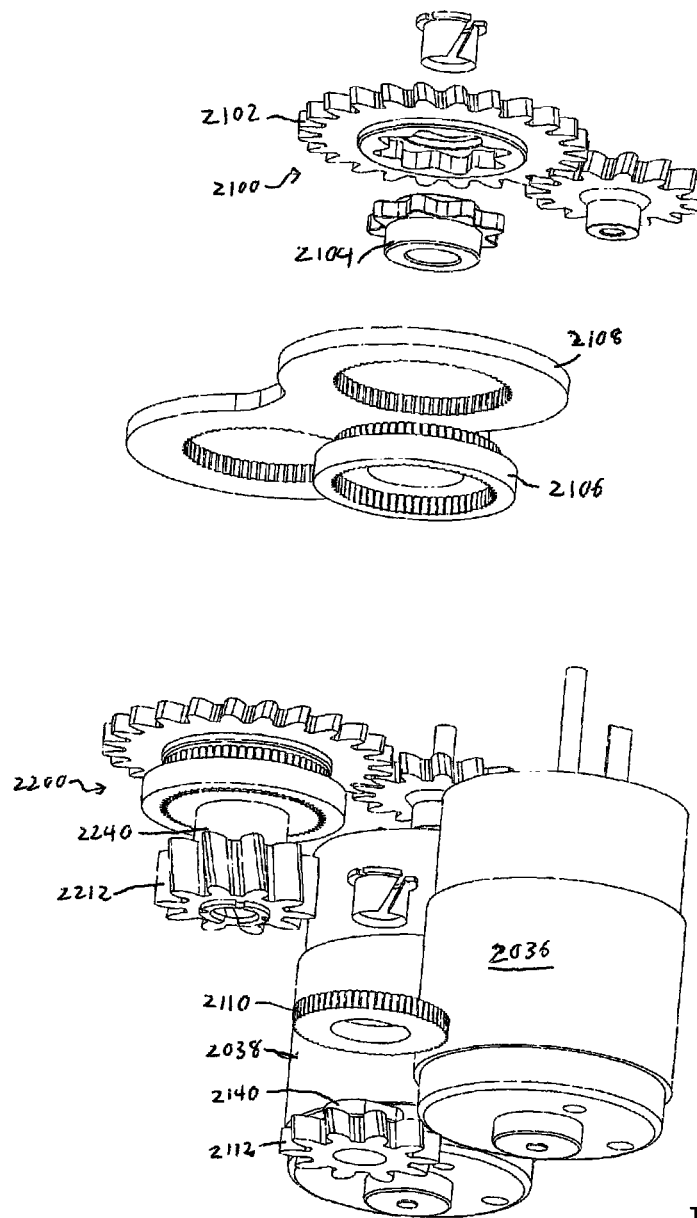
FIG. 17 is an exploded view from a different angle of the alternative cycloidal structure shown in FIG. 16.

FIGS. 16 and 17 illustrate an alternative cycloidal speed reducer design which can be used in the electric brake actuator illustrated in FIG. 10. Such an electric brake actuator would differ only in the design of the cycloidal speed reducer. The cycloidal speed reducers 2100 and 2200 themselves differ in the lengths of the shafts 2140, 2240 fixed to their respective output gears 2112, 2212 but can otherwise be the same, and so only the cycloidal speed reducer 2100 is described in detail.

In the cycloidal speed reducer 2100, an eccentric 2104 is fixed to a reducer input gear 2102 so that the reducer input gear 2102 and the eccentric 2104 rotate together as a unit about a reducer axis. An input disc 2106 is configured to be driven by the eccentric 2104 in a cycloidal motion within a reducer housing 2108. In particular, the input disc 2106 includes an opening within which the eccentric 2104 rotates, and a set of external teeth which mesh with a set of internal teeth defined by the reducer housing 2108. The number of internal teeth defined by the reducer housing 2108 is one more than the number of external teeth defined by the input disc 2106. The combination of the eccentric motion of the input disc 2106 caused by the rotation of the eccentric 2104 and the meshing of the external teeth on the input disc 2106 with the greater number of internal teeth in the reducer housing 2108 causes a cycloidal motion to be imparted to the input disk 2106 when the reducer input gear 2102, and thus the first eccentric 2104, are caused to rotate by the motor 2036. Motor 2038 drives the components of the cycloidal speed reducer 2200 in similar fashion.

The input disc 2106 also defines a set of internal teeth which mesh with a set of external teeth defined by an output disc 2110. The number of internal teeth defined by the input disc 2106 is one more than the number of external teeth defined by the output disc 2110. The combination of the cycloidal motion of the input disc 2106 and the meshing of the external teeth on the output disc 2110 with the greater number of internal teeth on the input disc 2106 causes the output disc 2110 to rotate about the reducer axis in steady, non-cycloidal rotation. The output disc 2110 is fixed to the reducer output gear 2112 by the shaft 2140 such that they rotate together as a unit about the reducer axis. The output gears 2112 and 2212 of the speed reducers 2100 and 2200 are each operatively connected to an input of a differential as discussed in detail above.

The disclosed electric brake actuators exhibit reduced power consumption compared to known actuators, and peak currents are reduced. It is also possible to configure the electric brake actuators so that the motors begin operating at different times. The vehicle will thus not experience the inrush current of both motors simultaneously. This can also help reduce EMI generated by the electric brake actuators.

The detailed description above describes features and aspects of embodiments of an electric brake actuator disclosed by way of example. The invention is not limited, however, to the precise embodiments and variations described. Changes, modifications and equivalents can be employed by one skilled in the art without departing from the spirit and scope of the invention as defined in the appended claims. It is expressly intended that all such changes, modifications and equivalents which fall within the scope of the claims are embraced by the claims.

What is claimed is:

1. An electric brake actuator operatively connectable to a vehicle brake to operate the vehicle brake, the electric brake actuator comprising:
    a first electric motor having a first motor output shaft rotated by operation of the first electric motor to produce a first driving force and a first motor output gear fixed to the first motor output shaft;
    a second electric motor having a second motor output shaft rotated by operation of the second electric motor to produce a second driving force and a second motor output gear fixed to the second motor output shaft;
    an actuator output rotatable about an output axis and operatively connectable to the vehicle brake to operate the vehicle brake; and
    a differential operatively connected to both the first motor output gear and the second motor output gear and the actuator output to transfer the first and second driving forces to the actuator output by way of the differential,
    wherein an effective gear ratio between the first motor output gear and the actuator output is different from an effective gear ratio between the second motor output gear and the actuator output,
    the differential comprises a planetary gear set having a sun gear meshed with a plurality of planet gears and a ring gear meshed with the plurality of planet gears,
    the first motor output gear is operatively connected to a first intermediate gear fixed to the sun gear to transfer the first driving force to the sun gear, and the second motor output gear is operatively connected to a second intermediate gear fixed to the ring gear to transfer the second driving force to the ring gear,
    an effective gear ratio between the first motor output gear and the first intermediate gear is equal to an effective gear ratio between the second motor output gear and the second intermediate gear, and
    the electric brake actuator further comprises a first cycloidal speed reducer having a first reducer input rotatable about a first reducer axis and operatively connected to the first motor output gear to receive the first driving force, and a first reducer output rotatable about the first reducer axis and operatively connected to the first intermediate gear to transfer the first driving force to the first intermediate gear; and a second cycloidal speed reducer having a second reducer input rotatable about a second reducer axis and operatively connected to the second motor output gear to receive the second driving force, and a second reducer output rotatable about the second reducer axis and operatively connected to the second intermediate gear to transfer the second driving force to the second intermediate gear.

2. The electric brake actuator of claim 1, wherein the plurality of planet gears are rotatably mounted to a common carrier, a differential output is fixed to the common carrier, and the differential output is operatively connected to the actuator output to transfer the first and second driving forces to the actuator output.

3. The electric brake actuator of claim 1, wherein
    the first reducer input comprises a first eccentric,
    the first cycloidal speed reducer further comprises a first input disc configured to be driven by the first eccentric in a cycloidal motion, and
    the first reducer output comprises a first output disc configured to be driven by the first input disc in non-cycloidal rotation.

4. The electric brake actuator of claim 1, wherein
    the second reducer input comprises a second eccentric,
    the second cycloidal speed reducer further comprises a second input disc configured to be driven by the second eccentric in a cycloidal motion, and
    the second reducer output comprises a second output disc configured to be driven by the second input disc in non-cycloidal rotation.

5. An electric brake actuator operatively connectable to a vehicle brake to operate the vehicle brake, the electric brake actuator comprising:

a first electric motor having a first motor output shaft rotated by operation of the first electric motor to produce a first driving force and a first motor output gear fixed to the first motor output shaft;

an actuator output rotatable about an output axis and operatively connectable to the vehicle brake to operate the vehicle brake; and a first cycloidal speed reducer having a first reducer input rotatable about a first reducer axis and operatively connected to the first motor output gear to receive the first driving force, and a first reducer output rotatable about the first reducer axis and operatively connected to the actuator output to transfer the first driving force to the actuator output, wherein the first reducer axis is non-coaxial with both the first motor output shaft and the output axis.

6. The electric brake actuator of claim 5, wherein the first reducer input comprises a first eccentric, the first cycloidal speed reducer further comprises a first input disc configured to be driven by the first eccentric in a cycloidal motion, and the first reducer output comprises a first output disc configured to be driven by the first input disc in non-cycloidal rotation.

7. The electric brake actuator of claim 5, further comprising:

a second electric motor having a second motor output shaft rotated by operation of the second electric motor to produce a second driving force and a second motor output gear fixed to the second motor output shaft; and a second cycloidal speed reducer having a second reducer input rotatable about a second reducer axis and operatively connected to the second motor output gear to receive the second driving force, and a second reducer output rotatable about the second reducer axis and operatively connected to the actuator output to transfer the second driving force to the actuator output, wherein the first reducer axis is non-coaxial with both the second motor output shaft and the second reducer axis, and the second reducer axis is non-coaxial with the first motor output shaft, the second motor output shaft, and the output axis.

8. The electric brake actuator of claim 7, wherein the second reducer input comprises a second eccentric, the second cycloidal speed reducer further comprises a second input disc configured to be driven by the second eccentric in a cycloidal motion, and the second reducer output comprises a second output disc configured to be driven by the second input disc in non-cycloidal rotation.

9. The electric brake actuator of claim 7, further comprising a differential, said differential comprising a planetary gear having a sun gear meshed with a plurality of planet gears and a ring gear meshed with the plurality of planet gears, wherein the first reducer output is operatively connected to a first intermediate gear fixed to the sun gear to transfer the first driving force to the sun gear, and the second reducer output is operatively connected to a second intermediate gear fixed to the ring gear to transfer the second driving force to the ring gear.

10. The electric brake actuator of claim 9, wherein the plurality of planet gears are rotatably mounted to a common carrier, a differential output is fixed to the common carrier, and the differential output is operatively connected to the actuator output to transfer the first and second driving forces to the actuator output.

11. An electric brake actuator operatively connectable to a vehicle brake to operate the vehicle brake, the electric brake actuator comprising:

a first electric motor having a first motor output shaft rotated by operation of the first electric motor to produce a first driving force and a first motor output gear fixed to the first motor output shaft;

a second electric motor having a second motor output shaft rotated by operation of the second electric motor to produce a second driving force and a second motor output gear fixed to the second motor output shaft;

an actuator output rotatable about an output axis and operatively connectable to the vehicle brake to operate the vehicle brake;

a first cycloidal speed reducer having a first reducer input rotatable about a first reducer axis and operatively connected to the first motor output gear to receive the first driving force, and a first reducer output rotatable about the first reducer axis and operatively connected to the actuator output to transfer the first driving force to the actuator output; and a second cycloidal speed reducer having a second reducer input rotatable about a second reducer axis and operatively connected to the second motor output gear to receive the second driving force, and a second reducer output rotatable about the second reducer axis and operatively connected to the actuator output to transfer the second driving force to the actuator output.

12. The electric brake actuator of claim 11, further comprising a differential, said differential comprising a planetary gear having a sun gear meshed with a plurality of planet gears and a ring gear meshed with the plurality of planet gears, wherein the first reducer output is operatively connected to a first intermediate gear fixed to the sun gear to transfer the first driving force to the sun gear, and the second reducer output is operatively connected to a second intermediate gear fixed to the ring gear to transfer the second driving force to the ring gear.

13. The electric brake actuator of claim 12, wherein the plurality of planet gears are rotatably mounted to a common carrier, a differential output is fixed to the common carrier, and the differential output is operatively connected to the actuator output to transfer the first and second driving forces to the actuator output.

14. The electric brake actuator of claim 11, wherein the first reducer input comprises a first eccentric, the first cycloidal speed reducer further comprises a first input disc configured to be driven by the first eccentric in a cycloidal motion, and the first reducer output comprises a first output disc configured to be driven by the first input disc in non-cycloidal rotation.

15. The electric brake actuator of claim 11, wherein the second reducer input comprises a second eccentric, the second cycloidal speed reducer further comprises a second input disc configured to be driven by the second eccentric in a cycloidal motion, and the second reducer output comprises a second output disc configured to be driven by the second input disc in non-cycloidal rotation.

* * * * *